United States Patent
Incorvia et al.

(10) Patent No.: US 9,309,029 B2
(45) Date of Patent: Apr. 12, 2016

(54) METHOD OF MOLDING A HIGH MOISTURE BARRIER AND SELF-DESICCATING CONTAINER WITH LIVING HINGE

(75) Inventors: Samuel A. Incorvia, North Tonawanda, NY (US); Thomas H. Powers, Mayville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 605 days.

(21) Appl. No.: 12/398,751

(22) Filed: Mar. 5, 2009

(65) Prior Publication Data

US 2010/0224646 A1  Sep. 9, 2010

(51) Int. Cl.
| | |
|---|---|
| B29C 45/16 | (2006.01) |
| B65D 43/00 | (2006.01) |
| B29C 45/00 | (2006.01) |
| B65D 81/26 | (2006.01) |
| B65D 43/16 | (2006.01) |

(52) U.S. Cl.
CPC ............ *B65D 43/00* (2013.01); *B29C 45/0081* (2013.01); *B29C 45/16* (2013.01); *B65D 43/162* (2013.01); *B65D 81/266* (2013.01)

(58) Field of Classification Search
None
See application file for complete search history.

(56) References Cited

U.S. PATENT DOCUMENTS

| | | | | |
|---|---|---|---|---|
| 3,415,361 A | * | 12/1968 | Chambliss et al. | 206/221 |
| 6,613,865 B1 | | 9/2003 | Magunia et al. | |
| 2004/0178540 A1 | * | 9/2004 | Huisman | 264/478 |

FOREIGN PATENT DOCUMENTS

| | | | |
|---|---|---|---|
| CN | 1185139 | | 6/1998 |
| CN | 1728732 | | 2/2006 |
| CN | 101166571 | | 4/2008 |
| CN | 101180368 | | 5/2008 |
| CN | 101305045 | | 11/2008 |
| JP | 2001-315864 A | | 11/2001 |
| JP | 2001315864 | | 11/2001 |
| WO | 96-33108 A1 | | 10/1996 |
| WO | WO9633108 | | 10/1996 |
| WO | 2005-080076 A1 | | 9/2005 |
| WO | WO 2006/045087 | * | 4/2006 |
| WO | WO2008116888 | | 10/2008 |
| WO | WO2010/101915 | | 9/2010 |

OTHER PUBLICATIONS

International Search Report and Written Opinion for PCT/US2010/025917 dated Oct. 19, 2010, 13 pages.
eFunda Engineering Fundamentals, Living Hinge, www.efunda.com, 2009, 4 pages, eFunda, Inc.
Translated Korean Office Action mailed Dec. 23, 2013 for Korean patent application No. 10-2011-7023230, a counterpart foreign application of U.S. Appl. No. 12/398,751, 6 pages.
Translated Belarus Office Action mailed Feb. 6, 2014 for Belarus patent application No. a20111287, a counterpart foreign application of U.S. Appl. No. 12/398,751, 7 pages.

(Continued)

*Primary Examiner* — Edmund Lee
(74) *Attorney, Agent, or Firm* — Lee & Hayes, PLLC

(57) ABSTRACT

A self desiccating container with a living hinge includes a container body made from a resin bonded sorbent and at least one attachment feature, and a container closure having a closure portion engageable with the container body to close the body and an attachment feature compatible with the attachment feature on the container body for securing the closure to the body, and a living hinge connecting the closure portion to the attachment feature.

14 Claims, 4 Drawing Sheets

(56) References Cited

OTHER PUBLICATIONS

Translated Korean Office Action mailed Apr. 21, 2014 for Korean patent application No. 10-2011-7023230, a counterpart foreign application of U.S. Appl. No. 12/398,751, 5 pages.
Translated Chinese Office Action mailed Nov. 1, 2013 for Chinese patent application No. 201080010727.8, a counterpart foreign application of U.S. Appl. No. 12/398,751, 27 pages.
Translated Chinese Office Action mailed Jun. 23, 2014 for Chinese patent application No. 201080010727.8, a counterpart foreign application of U.S. Appl. No. 12/398,751, 26 pages.
Mexian Office Action mailed Jun. 5, 2014 for Mexican patent application No. 2011-009307, a counterpart foreign application of U.S. Appl. No. 12/398,751, 3 pages.
Translated Singapore Office Action mailed Jul. 3, 2014 for Singapore patent application No. 201106349.2, a counterpart foreign application of U.S. Appl. No. 12/398,751, 12 pages.
Israeli Office Action mailed Apr. 28, 2015 for Israeli patent application No. 211414, a counterpart foreign application of U.S. Appl. No. 12/398,751, 7 pages (including English Translation of Office Action).
Korean Office Action mailed Oct. 7, 2015 for Korean patent application No. 10-2014-7020347, a counterpart foreign application of U.S. Appl. No. 12/398,751, 5 pages.

\* cited by examiner

METHOD OF MOLDING A HIGH MOISTURE BARRIER AND SELF-DESICCATING CONTAINER WITH LIVING HINGE

FIELD OF THE INVENTION

Technical Field

This invention relates generally to containers for food, pharmaceuticals and other items and more particularly to such containers that are resistant to the ingress of moisture, provide for the reduction of moisture content within the package, and have a closure attached to the container with a living hinge.

BACKGROUND OF THE INVENTION

Description of Related Art

Living hinges, most commonly resin-based hinges are usually relatively thin and flexible and join two rigid or semi-rigid parts of a container together, allowing them to bend along the line of the hinge. Conveniently, living hinges are manufactured in an injection molding operation that simultaneously creates the hinge and the two package components connected to respective sides of the hinge. Living hinges are convenient, reduce the price of articles in which they are used, and have a relatively long life.

In pharmaceutical and food packaging containers, as well as other containers, it is oftentimes desirable to attach a closure element to the package being closed so that it is not displaced and to facilitate easy opening and closing of the package. Living hinges provide a convenient way to do this and are used on a wide variety of such packages.

It is also desirable in packages used for food and pharmaceuticals as well as other items that are degraded by excess moisture content in the package, to provide a package that is made from a material that provides a desiccating function, that is, a material that includes ingredients that cause the material itself to absorb water vapor and reduce the humidity within the package. Such materials are generally known and packages of the type described have been provided in the past.

The composition of moisture absorbing plastic materials has, heretofore, been inconsistent with using such material to provide a living hinge. In order to absorb useful amounts of moisture, plastics and other resins used to form containers must contain a high percentage of additives such as desiccant material. The presence of desiccant material in amounts sufficient to provide an adequate desiccating function changes the characteristics of the plastic material. The material becomes less flexible and prone to strain and flexure fatigue and ultimately breakage when repeatedly stressed as is required of materials from which living hinges are made.

Therefore, a desiccating package with a living hinge cannot be made from a single material and still provide both an adequate living hinge and an adequate desiccating function.

It is an object of this invention to provide a desiccating container having a living hinge that addresses the limitations of containers heretofore known.

SUMMARY OF THE INVENTION

Briefly stated, a self desiccating container with a living hinge includes a container body made from a resin bonded sorbent and at least one attachment feature, and a container closure having a closure portion engageable with the container body to close the body and an attachment feature compatible with the attachment feature on the container body for securing the closure to the body, and a living hinge connecting the closure portion to the attachment feature.

In accordance with another aspect of the invention, the body of the container and the container closure characterized by first and second different flex moduli, the flex modulus of the closure being greater than the flex modulus of the container.

In accordance with another aspect of the invention, the container body comprises high density polyethylene.

In accordance with another aspect of the invention, the container body comprises polypropylene.

In accordance with another aspect of the invention, the container body comprises between about 5 and about 50, preferably about 30% by weight of desiccant selected from the group consisting of gel or sieve, clay, calcium oxide, or carbon.

In accordance with another aspect of the invention, the container body and container are different colors.

In accordance with another aspect of the invention, the resin bonded sorbent comprises a resin bonded desiccant.

In accordance with another aspect of the invention, the container body comprises an oxygen scavenger.

In accordance with yet another aspect of the invention, the attachment feature on the closure comprises an annular ring.

In accordance with yet another aspect of the invention, the annular ring comprises a plurality of aperture.

In accordance with still another aspect of the invention, the attachment feature on the container body comprises a plurality of projections extendable into the plurality of apertures.

In accordance with a still further aspect of the invention, the attachment feature on the container body comprises a tapered region.

BRIEF DESCRIPTION OF THE DRAWING FIGURES

The novel aspects of the invention are set forth with particularity in the appended claims. The invention itself, together with further objects and advantages thereof may be more readily understood by reference to the following detailed description of presently preferred embodiments thereof taken in conjunction with the accompanying drawing in which:

DETAILED DESCRIPTION OF THE INVENTION

Figure 1:
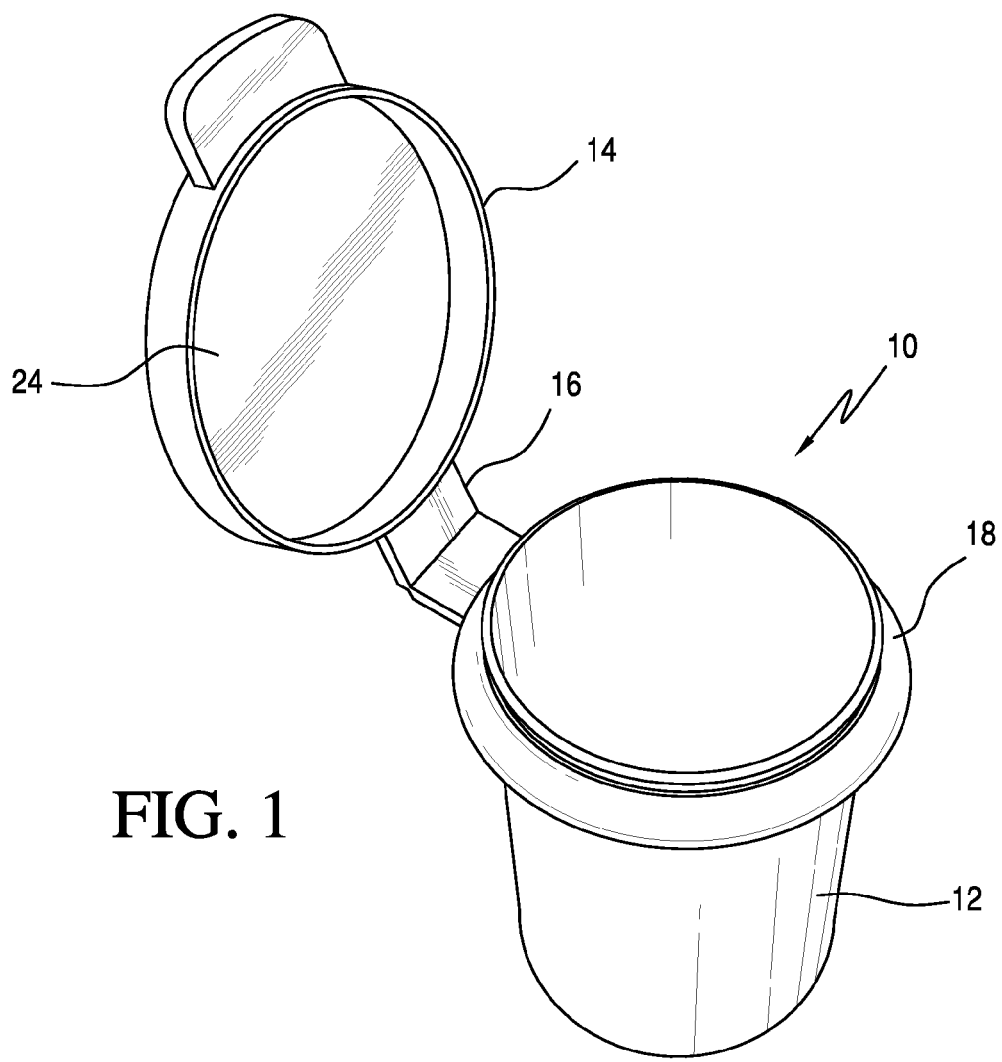
FIGS. 1 and 2 are perspective views of a container in accordance with this invention taken from different perspectives.
Figure 2:
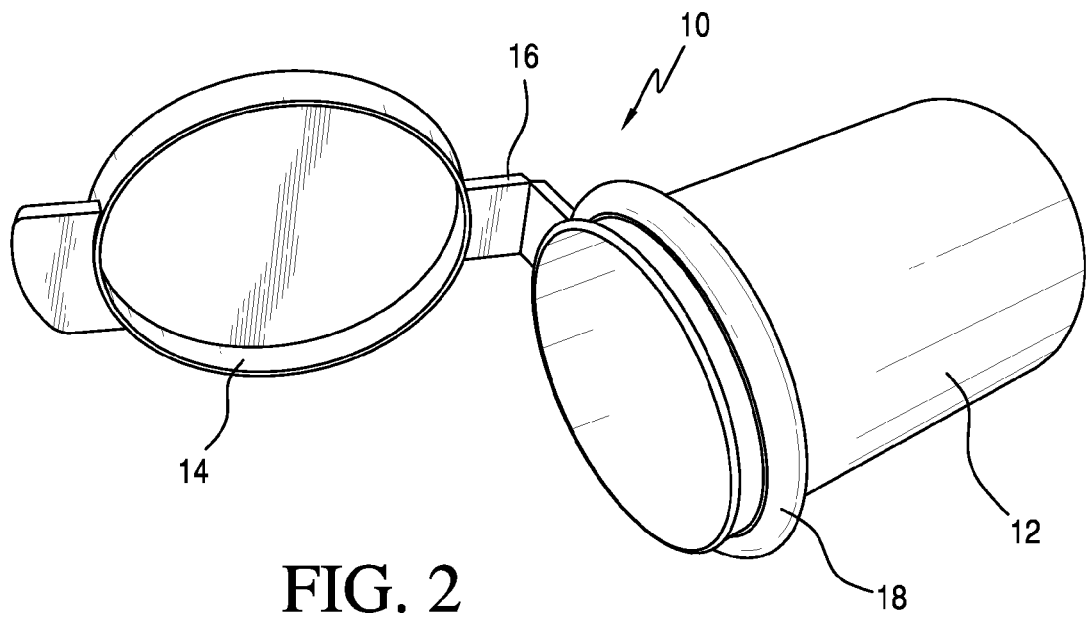

Referring now to FIG. 1, a container in accordance with this invention is illustrated in a perspective view. The container indicated generally at 10 includes a container body 12 and a container closure 14 having a cap and an attachment feature 18 assembled on the body. A living hinge 16 is connected between the cap 24 and the attachment feature 18. The living hinge 16 preferably has thicker portions 28, 30 attached to the closure cap 24 and the attachment feature 18 and a thinner hinge portion between the thicker portions.

Preferably, the closure 14, the living hinge 16, and the attachment feature 18 are made from a resin material such as polyethylene, polypropylene, or another polymer having characteristics suitable for making a living hinge. The container body 12 is preferably made from a polymer such as high density polyethylene or polypropylene, or another polymer with a low water vapor transmission rate. A desiccant such as silica gel, a sieve, clay, calcium oxide, or carbon is incorporated in the polymer in amounts between about 5% and 50%, preferably about 30%. In place of or in addition to the desiccant, an oxygen scavenger such as an iron-based oxygen scavenger may be included. Scented resins or gels can also be included where useful in the particular application.

Figure 3:
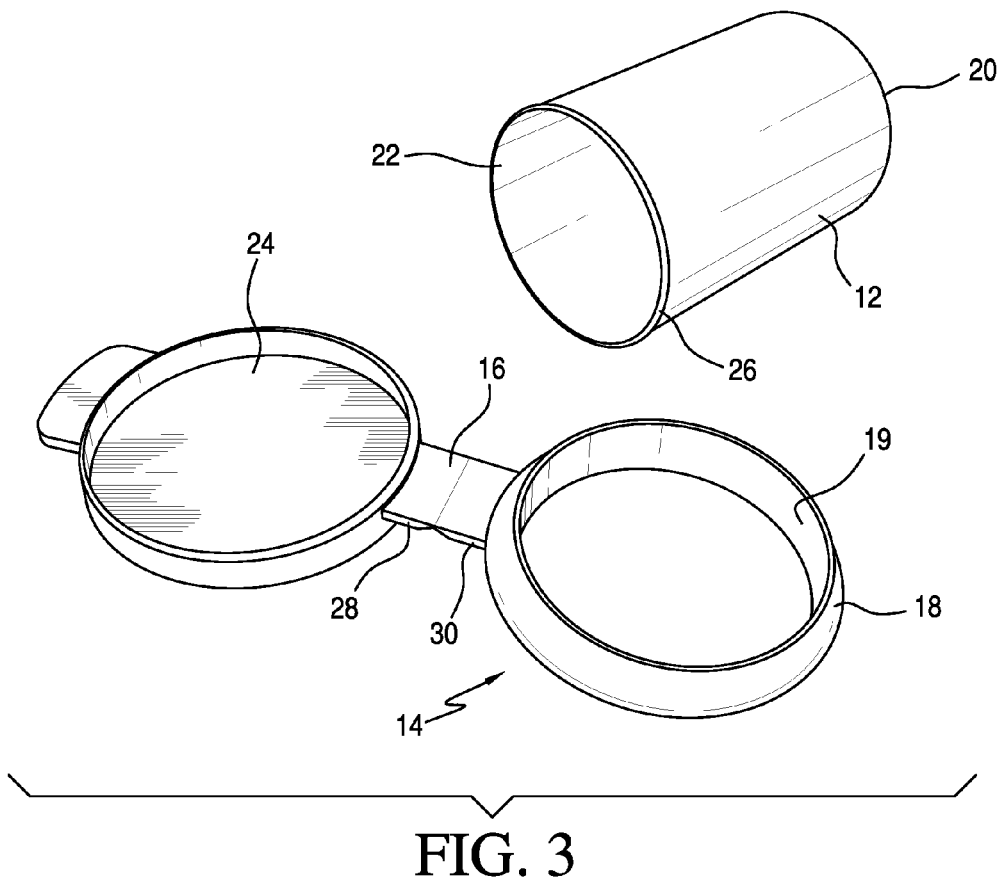
FIG. 3 is a perspective view showing the container body and the container closure separately.

FIG. 3 shows the container body 12 and the closure 14 separately. The body 12 is generally cylindrical. In accordance with one embodiment of the invention, the body 12 is tapered from a slightly smaller diameter at the base 20 to a slightly larger diameter at the open end 22. The open end of the body may have a slight outwardly extending lip 26. The closure 14 includes a cap 24 that preferably snaps on to the open end 22 of the body 12, perhaps engaging the lip 26, and an annular attachment feature 18 in the form of a ring having an inside surface 19 that is preferably tapered to match the taper of the body 12. The cap 24 and the attachment member 18 are connected by a living hinge 16 that has two thick portions 28, 30, connected by a thinner living hinge portion having a lesser thickness of about 0.2-0.3 mm. The thicker portions 28, 30 are connected to the cap 24 and the attachment feature 18, respectively. The precise form of the living hinge 16 is not limited in connection with this invention, any known living hinge construction may be used. The dimensions are solely by way of example and may vary depending upon materials and other factors.

Preferably, the closure 14 is formed from neat polymer, that is, polymer without a desiccating or oxygen absorbing additive. It is preferable that the attachment feature 18 fit snugly on the container body 12 when slid into a final position near the open end 22. The closure 14 may be made from polyethylene or polypropylene or other polymeric materials.

Figure 4:
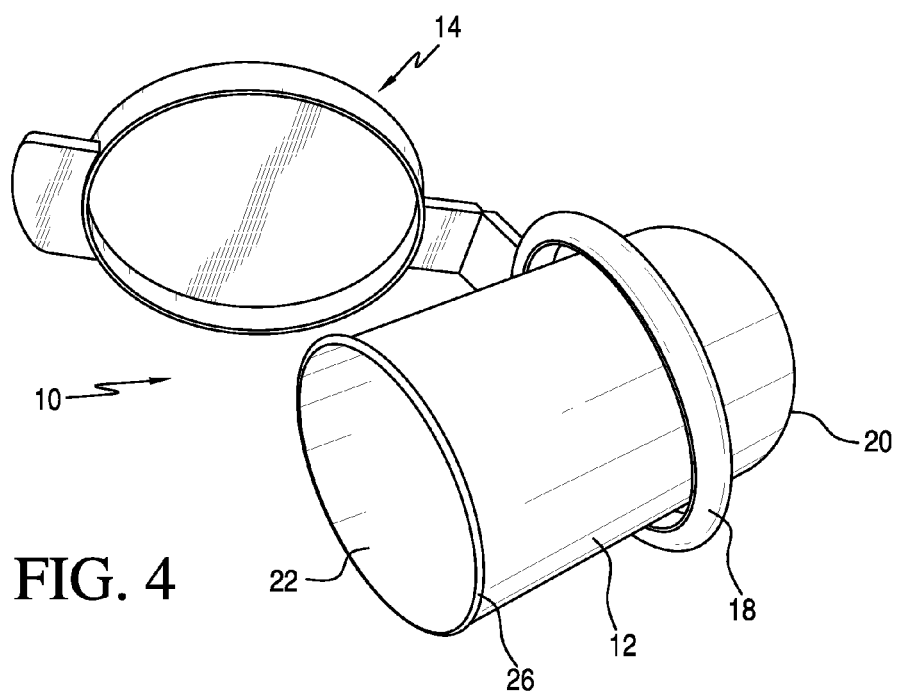
FIGS. 4 and 5 are perspective views showing the container closure being assembled to the container body.
Figure 5:
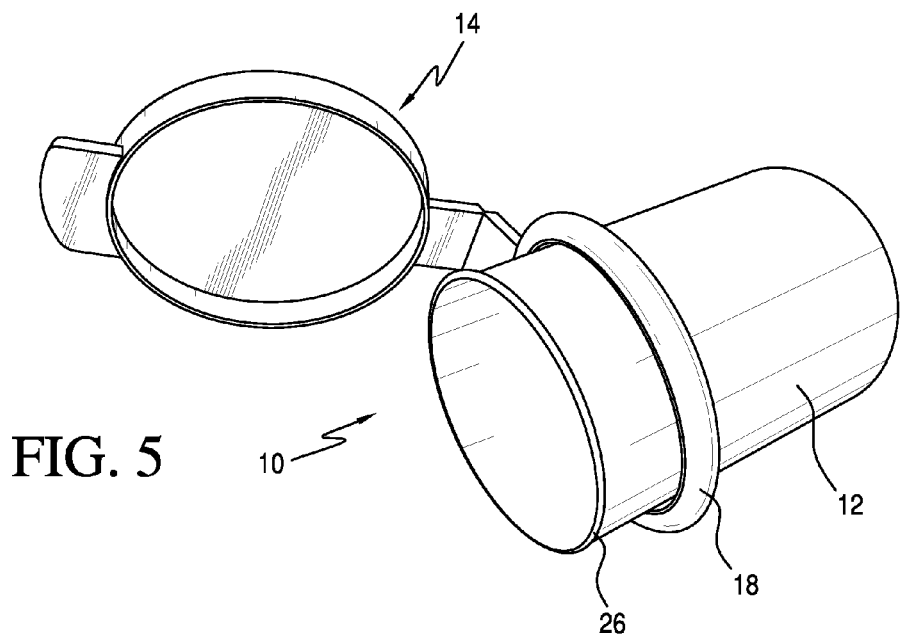

FIGS. 4 and 5 show how the container closure 14 is placed on the container body 12. As can be seen in FIG. 4, the closure 14 is slipped over the closed end 20 of the body 12 and, as shown in FIG. 5, slid up towards the larger open end 22 where it fits securely. Preferably, the container body 12 is tapered and the interior surface of the attachment feature 18 has a compatible taper.

Figure 6:
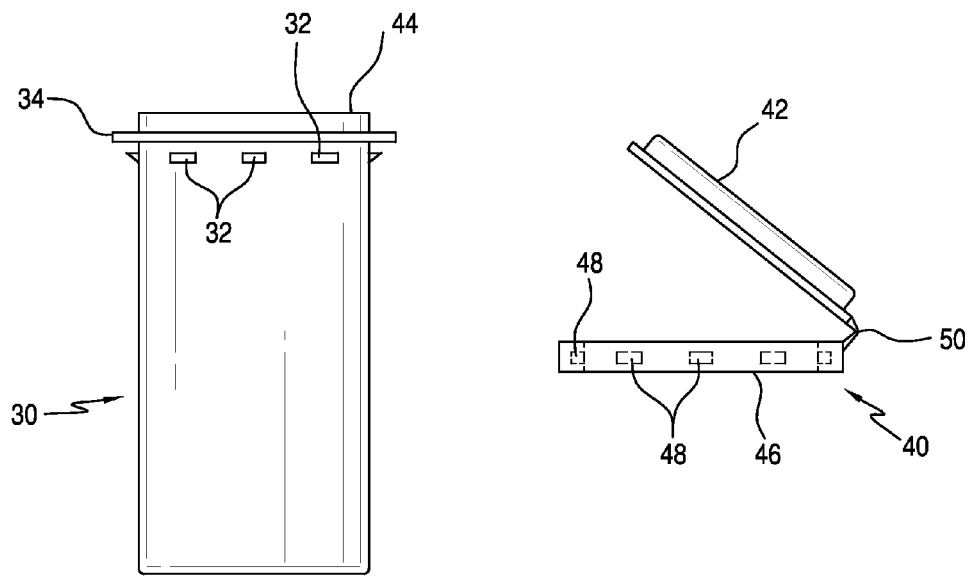
FIG. 6 is a perspective view showing a container body and a container closure having corresponding apertures and projections for securing the container closure to the container body.

FIG. 6 shows another embodiment of the invention in which the container body 30 includes a plurality of projections 32, each of which is preferably but not necessarily tapered or triangular in cross-section spaced a short distance from a circumferential annular ring 34 disposed adjacent the upper open end 44 of the container body 30. The corresponding container closure 40 includes a closure cap portion 42 engageable with the open upper end 44 of the container body and an attachment feature in the form of an annular band 46 having a plurality of apertures 48 formed therein spaced and sized to engage the like plurality of projections 32 on the container body 30. In the embodiment illustrated, the apertures 48 are generally rectangular in cross section. It will be understood that there may be fewer projections than apertures. A living hinge 50 connects the container closure cap portion 42 with the attachment feature or rim 46. The container body 30 and container closure 40 are formed from the materials mentioned in connection with the corresponding elements in FIGS. 1-5.

Figure 7A:
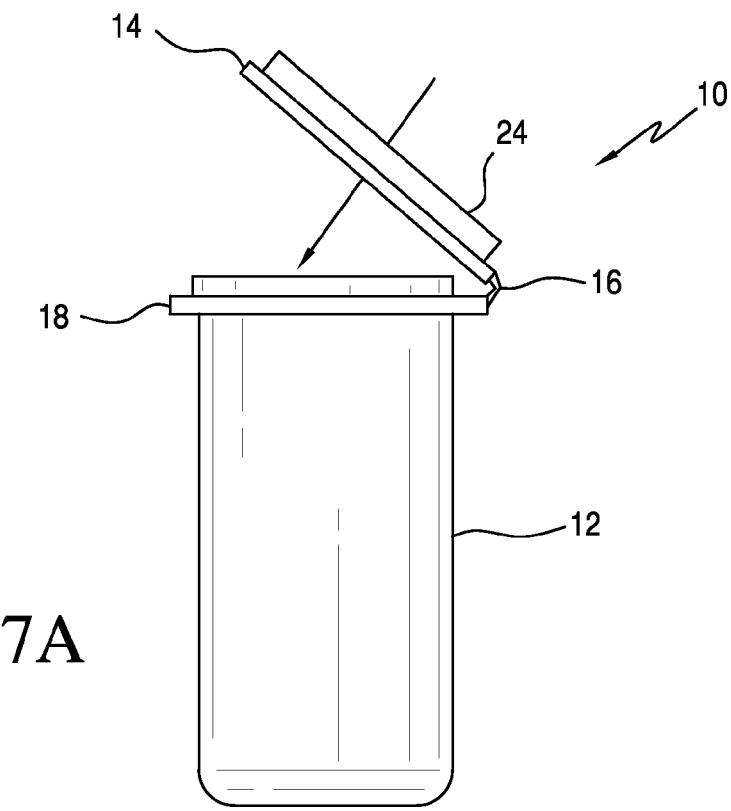
FIGS. 7A and 7B are side elevations of a container in accordance with another embodiment of this invention made by two shot injection molding.
Figure 7B:
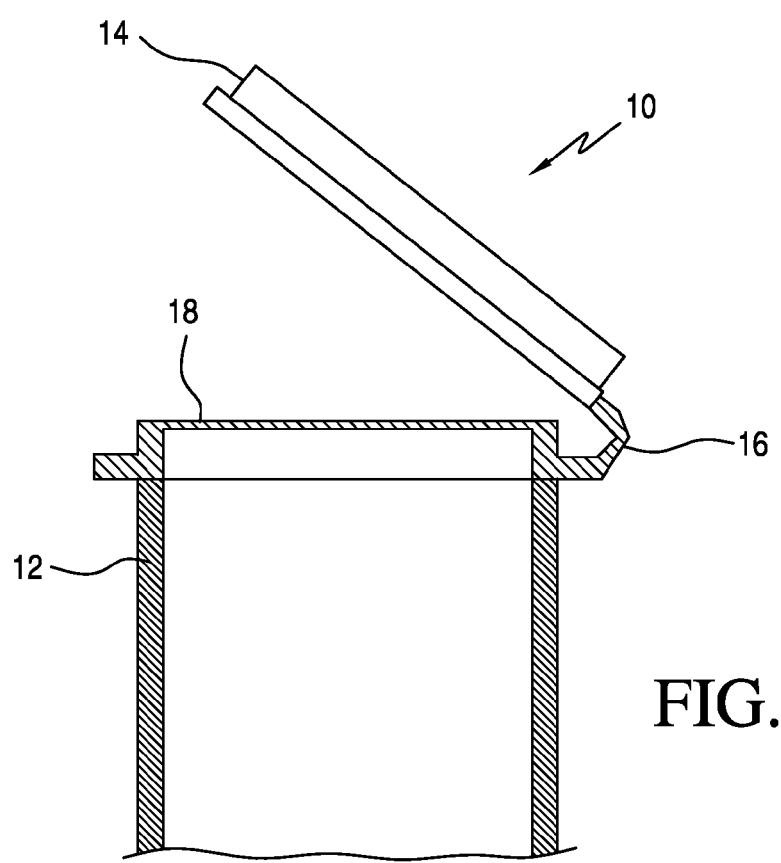

While the invention may be formed in two parts as described above, in accordance with another embodiment of the invention, the container is molded as a single piece using a two-shot molding process. Referring to FIGS. 7A and 7B, the bottom portion 12 of the container 10 is formed by filling a portion of the mold with a plastic material of the type already described that includes a desiccant and without curing that portion or removing it from the mold, the upper portion 18 of the container and the cap 14 are injected into the mold cavity using a plastic material of the type already discussed without a desiccant additive. The plastic materials for the two injected components should be selected so that they are compatible, that is that they will produce a single substantially continuous body of material with additive in the lower portion, but not in the upper portion and cap. Alternatively, the cap 14 could also include a desiccant additive leaving only the hinge portion 16 without an additive in a three-shot molding procedure.

While the invention has been described in connection with certain presently preferred embodiments thereof, various modifications and changes will suggest themselves to those of skill in the art, and it is intended that the invention as claimed includes such modifications and changes. For example, the body can be of various shapes and sizes, such as round, oval, square, and the like. While a particular arrangement of projections and apertures has been described, other snap-fit arrangements such as a groove in the annular member rather than an aperture could also be employed.

In addition, the attachment feature on the container body and the attachment feature on the container closure may be features that can be connected together by welding, gluing or the like. While the invention is shown with projections on the container body and apertures in the annular ring, the arrangement could be reversed so that there were apertures in the container body and projections in the annular ring.

The materials could be selected so that they could be welded to one another either by heat or ultrasonics. The container body and top could also be co-extruded from different materials.

The cap itself could include tamper evident features and/or snap and lock types of closures.

The container body, the top, or both could be color coated to identify the type and capacity of desiccant and/or oxygen absorber and/or other absorbers in the container body.

Applicants have discovered that the presence of a desiccant or oxygen absorber in the container body improves the characteristics of the body, namely the warp and shrink characteristics.

While polypropylene is an effective barrier to moisture, it is not preferred for manufacturing the container body because it has high warp and shrink characteristics. The same material, when provided with a desiccant material in accordance with this invention, has greatly improved warp and shrink characteristics.

As already discussed, the container body may have a water vapor absorbing material, an oxygen-absorbing material, an odor-absorbing material, a scented material, or a combination of two or more of these.

Containers made in accordance with this invention are useful in the pharmaceutical area, to package diagnostic test strips, as packages for hearing aides, and for snack and/or candy applications, as well as any other food applications where removing moisture from the package is desirable.

The invention claimed is:

1. A method of manufacturing a container having: a container body bottom portion and sidewall consisting of a resin bonded sorbent; a container closure engageable with and closing the container body bottom portion and sidewall; and a living hinge connecting the container closure to the container body bottom portion and sidewall, the method comprising:

injection molding, as a single piece using a two-shot molding process, the container body bottom portion and sidewall from a plastic material containing a sorbent additive, and the living hinge integral with the container body bottom portion and sidewall from a plastic material free from the sorbent additive, the container body bottom portion and sidewall consisting of the plastic material containing the sorbent additive.

2. The method of claim 1, further comprising injection molding the living hinge integral with the container body bottom portion via an upper portion of the container body, wherein the container body bottom portion is molded in a first shot, and the living hinge, the upper portion, and the closure are molded in a second shot free from the sorbent additive separate from the first shot.

3. The method of claim 1 in which the sorbent additive comprises a desiccant.

4. The method of claim 1 in which the sorbent additive comprises an oxygen absorber.

5. The method of claim 1, wherein the injection molding the living hinge further comprises injection molding the container closure integrally with the living hinge.

6. The method of claim 1 wherein at least one of the plastic material comprising the sorbent additive and the plastic material free from the sorbent additive comprises high density polyethylene.

7. The method of claim 1 wherein at least one of the plastic material comprising the sorbent additive and the plastic material free from the sorbent additive comprises polypropylene.

8. The method of claim 1 wherein the plastic material comprising the sorbent additive comprises between about five and about 50% by weight of the sorbent material.

9. The method of claim 8 characterized in that the container body comprises about 30% by weight of the sorbent material.

10. The method of claim 1 wherein the sorbent material is selected from the group consisting of gel or sieve, clay, calcium oxide, or carbon.

11. A method of forming a one-piece container having a container body bottom portion including a sidewall of the container, a closure, and a living hinge connecting the sidewall and the closure, the method comprising:

providing a mold;

filling a first portion of the mold corresponding to the container body bottom portion, including the sidewall, with a first material comprising a sorbent material such that the sidewall consists of the first material comprising the sorbent material; and filling a second portion of the mold corresponding to the living hinge with a second material free of sorbent material.

12. The method of claim 11, wherein the second portion of the mold further corresponds to the closure.

13. The method of claim 11, further comprising filling a third portion of the mold corresponding to the closure with the first material.

14. The method of claim 11, wherein the filling the second portion of the mold comprises filling the second portion of the mold in the absence of curing the first material and in the absence of removing the container body bottom portion from the mold.

* * * * *